UNITED STATES PATENT OFFICE.

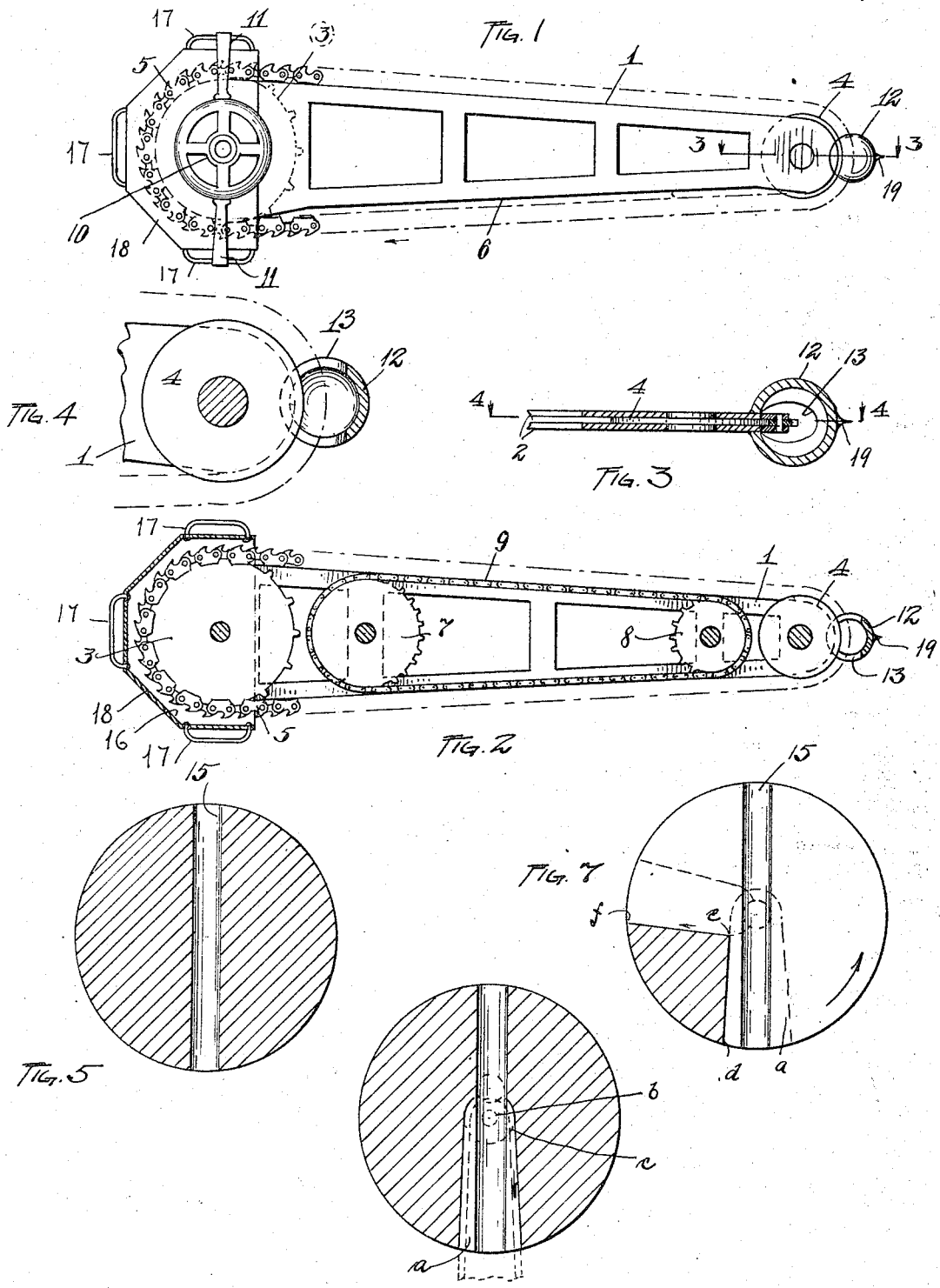

HAROLD L. HANSON, OF BUTTE, MONTANA, AND MARION B. SAWYER, OF EDMONDS, WASHINGTON.

METHOD OF AND APPARATUS FOR SAWING TREES.

1,342,213. Specification of Letters Patent. Patented June 1, 1920.

Application filed November 25, 1918. Serial No. 263,972.

*To all whom it may concern:*

Be it known that we, HAROLD L. HANSON and MARION B. SAWYER, both citizens of the United States, and residents of Butte, county of Silver Bow, State of Montana, and of Edmonds, county of Snohomish, and State of Washington, respectively, have jointly invented a new and useful Improvement in Methods of and Apparatus for Sawing Trees, of which the following is a specification, the principle of the invention being herein explained and the best mode in which we have contemplated applying that principle, so as to distinguish it from other inventions.

The present invention relates to a method of cutting trees and to apparatus for accomplishing the same. The object of the invention is the provision of an apparatus wherewith large trees, such as Douglas fir and the like, may be cheaply and expeditiously felled. Another object is to provide a power driven apparatus which can be easily handled and operated by one or two men, reducing the cost of felling trees. The device can be readily moved from tree to tree and operated without loss of time. To the accomplishment of the foregoing and related ends, said invention, then, consists of the means hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

In said annexed drawing:—

Figure 1 is a plan view of a sawing apparatus embodying our invention; Fig. 2 is a similar view partly in section of a modified form of our device; Fig. 3 is a sectional view of a detail on the line 3—3 of Fig. 1; Fig. 4 is an enlarged sectional view of the front portion of the device taken on the line 4—4 of Fig. 3; Fig. 5 is a sectional view illustrating the first step in the method used in sawing a tree; and Figs. 6 and 7 are other diagrammatic sectional views showing the remaining steps of the method used.

Heretofore the only satisfactory method of felling large trees such as Douglas fir and the like, has been to use a drag saw, operated by hand, the tree being cut through slowly and wedged as the cut grows deeper. Power devices have not been satisfactorily used with drag saws and the work has been done by hand.

Our improved sawing apparatus consists of a frame 1 of any suitable construction, here shown as made up of plates 2, between which a drive sprocket 3 is mounted near the rear end of the device. A housing 18 surrounds this end and the sprocket runs within an opening 16 through the housing which has handles 17 mounted thereon. In the forward end an idler pulley 4 is mounted and the chain saw 5 fits over and around the sprocket and the pulley and is driven by the former.

The frame work as shown in Fig. 1 is dropped away from the chain as shown at 6 along the cutting edge of the device. In the form shown in Fig. 2, two intermediate sprockets 7 and 8 are rotatably mounted in the frame and carry a chain 9 upon which the saw chain rides during its travel, to reduce friction. In this form the saw chain carries only the driving strain, thus reducing the liability to stretch and break during use.

Upon the rear end of the frame an electric motor 10 is mounted and is shown as being directly connected to the sprocket shaft but any suitable drive may of course be employed. The motor will be fitted with suitable controls and the device will be provided with two handles 11 so that it may be readily handled and operated.

The frame is tapered slightly the rear sprocket being larger than the idler pulley. A ball 12 is mounted on the frame in front, the ball being provided with a spike 19 and being slotted or hollowed out as at 13 to allow the chain saw to pass through and being welded or otherwise rigidly attached to the frame. The spike 19 acts as a holding means for the ball as the saw is swung around the tree and is particularly useful during the first part of the cut in preventing the ball from moving along the hole.

As illustrated in Fig. 5, a hole 15 is bored into or through tree, the hole being of sufficient diameter to allow the ball to enter easily. Then the ball is entered into the hole and the saw is forced into the tree until a single cut $a$ is made, usually until the cut extends beyond the center $b$ of the tree so that in effect a circular cut ($c$) is made around the center of the tree. The saw is then backed out so that the ball is approximately at the center of the tree and the saw is then swung around the tree, using the ball as a pivot until it reaches the position shown in Fig. 7 where d—e—f indicates the uncut portion. The tree will of course be wedged as necessary and when the portion d—e—f becomes small the tree will fall.

The hole and the ball on the device may in some cases be dispensed with but there is then difficulty in starting the first cut and no pivot is provided when the cut around the tree is started. By using a hole which is larger in diameter than the depth of the cut, the ball acts as a pivot about which the device may be readily swung to cut the remainder of the tree. It is of course obvious that the hole need not be bored completely through the tree and that any point along the center line of such hole may be used as the pivotal point about which the saw will swing.

As shown in the drawings the saw chain runs in a clockwise direction and the cut around the tree will be made in a counter-clockwise direction so that the chain saw will bring the cuttings or chips to the outside of the tree. As none of the chips have to pass through the ball in the operation of cutting around the tree the likelihood of the chain clogging in the ball is reduced to a minimum.

The method thus employed uses the device which we have perfected consisting of the motor driven chain saw and of course an auger or bit will be used to bore the hole. It will be readily seen that in certain cases it may be best to bore several holes and cut part of the tree from each hole or the hole may be bored through and the device used first in one side and then in the other. The ball on the device allows the first or slightly V shaped cut to be easily made and as the ball is larger than the cut, it still acts as a pivot about which the saw will be swung in making the cut around the tree.

The present device presents many advantages. The saw is power driven and two men can easily manage an outfit, one being used to wedge the tree and the other operating the saw proper. The hole through the tree and the ball make it easy to control and handle the saw during the cutting operation. If desirable more than one hole may be bored and cuts made simultaneously from each of the holes. Other advantages will be apparent as the device is easily carried from tree to tree and may be connected to any suitable generating mechanism. The device is simple, easily assembled and cleaned, yet strong and durable. The saws can be easily removed and sharpened and replaced. Thus, by having an extra chain saw the device can be continuously used, one saw being used while the other is cleaned and sharpened or repaired.

Other modes of applying the principle of our invention may be employed instead of the one explained, change being made as regards the steps or mechanism herein disclosed, provided the means stated by any of the following claims or the equivalent of such stated means be employed.

We therefore particularly point out and distinctly claim as our invention:—

1. In a method of cutting trees, the steps which consist of forming a cylindrical hole through the trunk, making a saw cut into the trunk along such hole as a center line, the cut being of less vertical dimension than the diameter of such hole, and then cutting around the trunk with a tool having means for using such hole as a pivotal retaining means.

2. In a method of cutting trees, the steps which consists of forming a cylindrical hole through the trunk, making a saw cut into the trunk along such hole as a center line, the cut being of less vertical dimension than the diameter of such hole, and then cutting around the trunk with a saw having a portion of greater vertical dimension than the cut, such portion being adapted to use such hole as a pivotal retaining means.

3. In a method of cutting trees, the steps which consist of forming a cylindrical hole through the trunk, making a saw cut into the trunk along such hole as a center line, the cut being of less vertical dimension than the diameter of such hole, and then cutting around the trunk with a saw having a portion of greater vertical dimension than the cut, such portion acting with such hole to maintain the pivotal point and to prevent removal of said tool except along the center line of such hole.

4. In a method of cutting trees, the steps of first forming an aperture through the trunk of the tree, making a cut into the trunk along such hole as a center line, such cut being of a less vertical dimension than the diameter of the hole, then using a chain saw having a portion of greater vertical dimension than the saw cut to fit in such hole and act as a pivotal axis, to cut around the trunk of the tree.

5. In an apparatus for sawing trees and the like, the combination of a frame, sprocket wheels mounted in said frame near the ends, a chain saw mounted over said sprockets and around said frame, power means for driving said chain saw, and a slotted ball attached to said frame at the front thereof, said chain saw passing through such slot in said ball.

Signed by us this 18th day of November, 1918.

HAROLD L. HANSON.
MARION B. SAWYER.